Patented Dec. 25, 1951

2,579,658

UNITED STATES PATENT OFFICE 2,579,658

3-METHYL-1-(1' - HYDROXY - 2',6',6'-TRI-METHYLCYCLOHEXYL) - OCTA - 3,5-DIEN-1-YN-7-ONE AND PROCESS OF PREPARING SAME

Ronald Major Evans, Ickenham, England, assignor to Glaxo Laboratories Limited, Greenford, England, a British company No Drawing. Application September 5, 1950, Serial No. 183,305. In Great Britain September 13, 1949

8 Claims. (Cl. 260—586)

This invention is concerned with improvements in or relating to the preparation of a new unsaturated ketone, namely 3-methyl-1-(1'-hydroxy - 2':6':6' - trimethylcyclohexyl)octa - 3:5-dien-1-yn-7-one which may be represented by the following structural formula

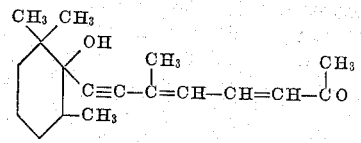

and which is useful in the synthesis of vitamin A.

I have found that surprisingly the new ketone may be readily prepared from the corresponding carbinol by means of a simplified oxidation technique using manganese dioxide.

Accordingly the invention comprises the new ketone 3 - methyl - 1 - (1' - hydroxy - 2':6':6' - trimethylcyclohexyl)octa - 3:5 - dien - 1 - yn - 7-one, represented by the structural formula given above.

According to a further feature of the invention there is provided a process for the preparation of a new unsaturated ketone, namely 3-methyl - 1 - (1' - hydroxy - 2':6:6' - trimethylcyclohexyl)octa-3:5-dien-1-yn-7-one in which the carbinol, 3-methyl-1-(1'-hydroxy-2':6':6'-trimethylcyclohexyl)octa-3:5-dien-1-yn-7-ol is reacted with manganese dioxide in the presence of an inert organic solvent.

By the term "inert organic solvent" I mean an organic solvent which itself has no demonstratable reaction on the reactants or the products of the reaction. Preferred examples of such solvents are light petroleum, benzene, chloroform, carbon tetrachloride, dioxan or mixtures of these solvents. It may be mentioned that the use of mixtures of solvents often proves advantageous in the process according to the invention firstly in order to facilitate temperature control of the reaction by regulating the boiling point of the reaction medium, and secondly because the carbinol and the ketone are sparingly soluble in hydrocarbon solvents and only dissolve readily when such solvents are mixed with the more powerful solvents.

The manganese dioxide should preferably be finely divided and freshly precipitated and is preferably used in large excess.

I have found that the time required to reach an optimal yield under any given set of reaction conditions is dependent upon the temperature of the reaction and the activity of the manganese dioxide used. Thus the time required for the reaction may, for example, vary from one hour to several days dependent on the conditions employed. Where a very active batch of manganese dioxide is used the reaction may for example be brought about at room temperature in one hour but where less active manganese dioxide is used at the same temperature a period of several days may be required; in the latter case however the time required may be reduced, for example to 24 hours by carrying out the reaction at an elevated temperature. At present I prefer to carry out the reaction at temperatures within the range of from 0° C. to 80° C. It is generally convenient to carry out preliminary experiments with any particular batch of manganese dioxide to determine the most favourable conditions of reaction in each case.

The reaction may for example be carried out by shaking or stirring a suspension of manganese dioxide in a solution of the carbinol in the suitable solvent or by percolating a solution of the carbinol in the suitable solvent through a column of manganese dioxide. The reaction is also preferably carried out in an inert atmosphere for example in an atmosphere of nitrogen.

The new ketone in the purest form it has so far been possible to prepare has the following characteristics:

B. P.=140° C./10$^{-4}$ mm.

$n_D^{15°}$=1.5708

Light absorption—
  Max. 3040 Å.
  $E_{1\,cm.}^{1\%}$ 970
  $\epsilon$26,500

It will be understood that these characteristics are liable to variation dependent on the purity of the material.

The carbinol, 3-methyl-1-(1'-hydroxy-2':6':6'-trimethylcyclohexyl)octa - 3:5 - dien - 1 - yn - 7-ol may be prepared by any convenient method; thus for example this carbinol may be prepared as described in my copending application Serial No. 176,912, filed July 31, 1950.

In order that the invention may be well understood the following examples are given only as illustrations:

*Example 1*

3 - methyl - 1 - (1' - hydroxy - 2':6':6' - trimethylcyclohexyl)octa-3:5-dien-1-yn-7-ol (2 g.) dissolved in petroleum ether (B. P. 40°–60° C.; 200 cc.) and carbon tetrachloride (200 cc.) was shaken with manganese dioxide (30 g.) for six days. Isolation of the product gave the crude ketone (1.4 g.)—

B. P. 140° C/10⁻⁵ mm.
$n_D^{14°}$, 1.550
Light absorption:
 Max. 3010 and 2240 Å.
 $E_{1\,cm.}^{1\%}$ 629 and 449
 ε 17,000 and 12,000
Semi-carbazone M. P. 194° C. after softening at 140–145° C.
(Found: N, 12.6. $C_{19}H_{29}O_2N_3$ requires N, 12.7%.)
 Max. 3330, 3160 Å.
 $E_{1\,cm.}^{1\%}$ 1319 and 1509
 ε 43,500 and 49,800

Example 2

A solution of the carbinol (0.8 g.) in benzene (50 ml.) was stirred with manganese dioxide (8 g.) while heating under reflux for 1½ hours. After filtration and evaporation the product was distilled under high vacuum at 120°/10⁻⁷ mm. The resultant ketone (0.3 g.) forms a pale yellow viscous liquid.

$n_D^{14°}=1.5670$
Light absorption in n-hexane:
 Max. 3030 and 2230 Å.
 ε 25,800 and 7,350

Example 3

A solution of the carbinol (1 g.) in chloroform (50 ml.) was stirred at 0° for 4 hours with manganese dioxide (10 g.). The resultant ketone (0.5 g.) was isolated in the usual way.

$n_D^{14°}=1.5640$
Light absorption in n-hexane:
 Max. 3020 Å.
 ε 26,200

Example 4

A solution of the carbinol (1 g.) in light petroleum of B. P. 40–60° (20 ml.) was passed down a column of manganese dioxide (10 g.) during 2 hours. The column was well washed with petroleum and the ketone (0.5 g.) isolated in the usual way.

$n_D^{14°}=1.5540$
Light absorption in n-hexane:
 Max. 3040 Å.
 ε 23,700

Example 5

A solution of the carbinol (3.6 g.) in dioxan (180 c. c.) was stirred at room temperature for 1½ hours with manganese dioxide (36 g.) The resultant ketone (3.1 g.) was isolated in the usual way.

$n_D^{15°}$ 1.5580
Light absorption in n-hexane:
 Max. 3020 Å.
 ε 24,800

I claim:

1. As a new compound, 3-methyl-1-(1'-hydroxy - 2':6':6' - trimethylcyclohexyl) - octa - 3:5-dien-1-yn-7-one represented by the following structural formula

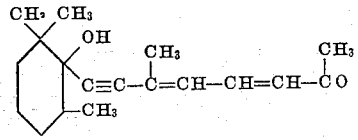

2. A process for the preparation of 3-methyl-1-(1' - hydroxy - 2':6':6' - trimethylcyclohexyl)-octa-3:5-dien-1-yn-7-one in which 3-methyl-1-(1' - hydroxy - 2':6':6' - trimethylcylcyclohexyl)-octa-3:5-dien-1-yn-7-ol is reacted with manganese dioxide in the presence of an inert organic solvent.

3. A process as claimed in claim 2 in which the solvent is selected from the group consisting of light petroleum, benzene, chloroform, carbon tetrachloride, dioxan and mixtures thereof.

4. A process as claimed in claim 2 in which the reaction is carried out by agitating a suspension of manganese dioxide in a solution of 3 - methyl - 1 - (1' - hydroxy - 2':6':6' - trimethylcyclohexyl) octa-3:5-dien-1-yn-7-ol.

5. A process as claimed in claim 2 in which the reaction is carried out by percolating a solution of 3-methyl-1-(1'-hydroxy-2':6':6-trimethylcyclohexyl) octa-3:5-dien-1-yn-7-ol in the solvent through a column of manganese dioxide.

6. A process for the preparation of 3-methyl-1-(1' - hydroxy - 2':6':6' - trimethylcyclohexyl)-octa-3:5-dien-1-yn-7-one which comprises dissolving 3-methyl-1-(1'-hydroxy-2':6':6'-trimethylcyclohexyl)-octa-3:5-dien-1-yn-7-ol in light petroleum and agitating a suspension of manganese dioxide in the resulting solution.

7. A process for the preparation of 3-methyl-1-(1' - hydroxy - 2':6':6' - trimethylcyclohexyl)-octa-3:5-dien-1-yn-7-one which comprises dissolving 3-methyl-1-(1'hydroxy - 2':6':6' trimethylcyclohexyl)-octa-3:5-dien-1-yn-7-ol in light petroleum and percolating the resulting solution through a column of manganese dioxide.

8. A process as claimed in claim 2 in which the reaction is carried out at a temperature between 0° C. and 80° C.

RONALD MAJOR EVANS.

REFERENCES CITED

The following references are of record in the file of this patent:

Heilbron et al.: J. Chem. Soc., 1949 vol., pages 2023–2030.
Ball et al.: Biochemical Journal, vol. 42, pages 516–523 (1948).